Sept. 18, 1923. 1,468,365
J. T. M. JOHNSTON
HEATER FOR BITUMEN OR OTHER MATERIALS
Filed Sept. 26, 1922  2 Sheets-Sheet 1
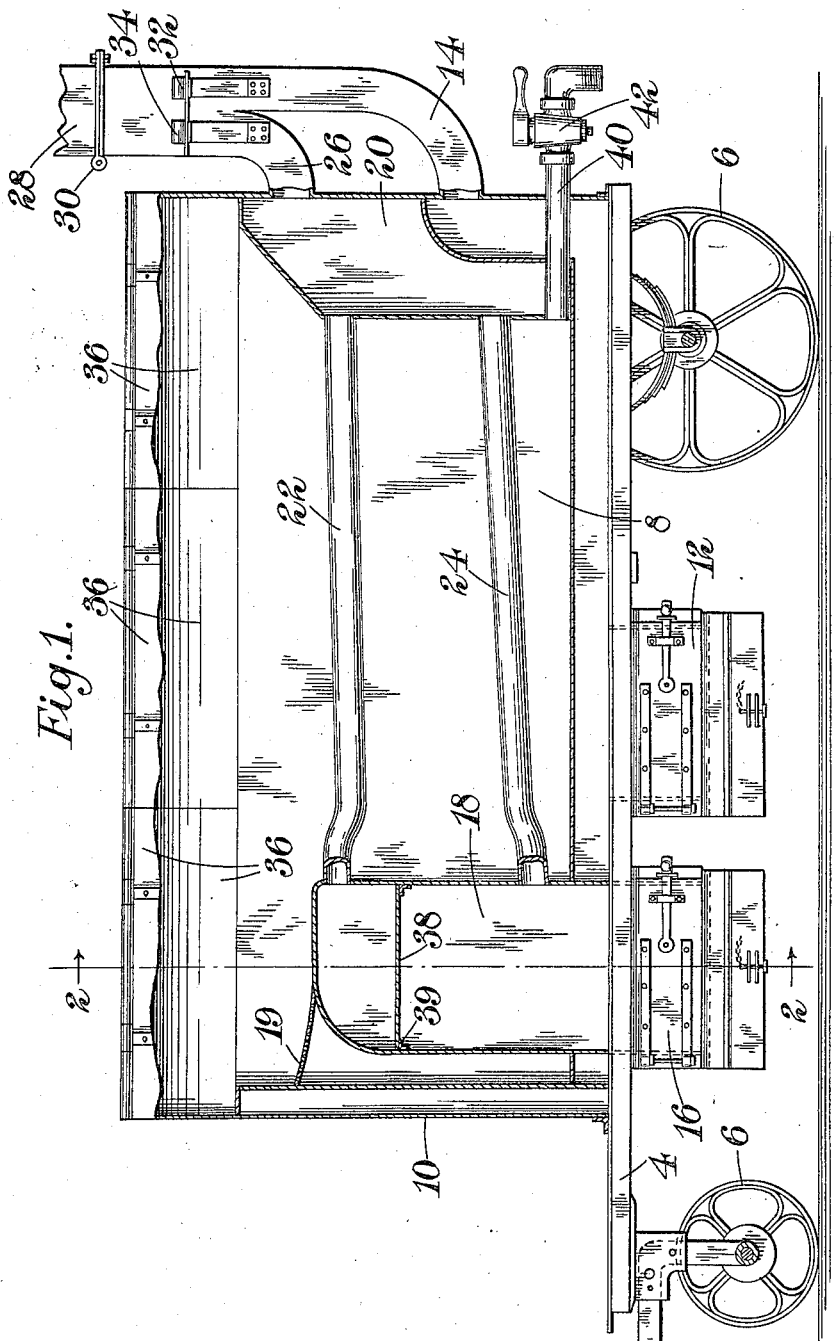
INVENTOR:

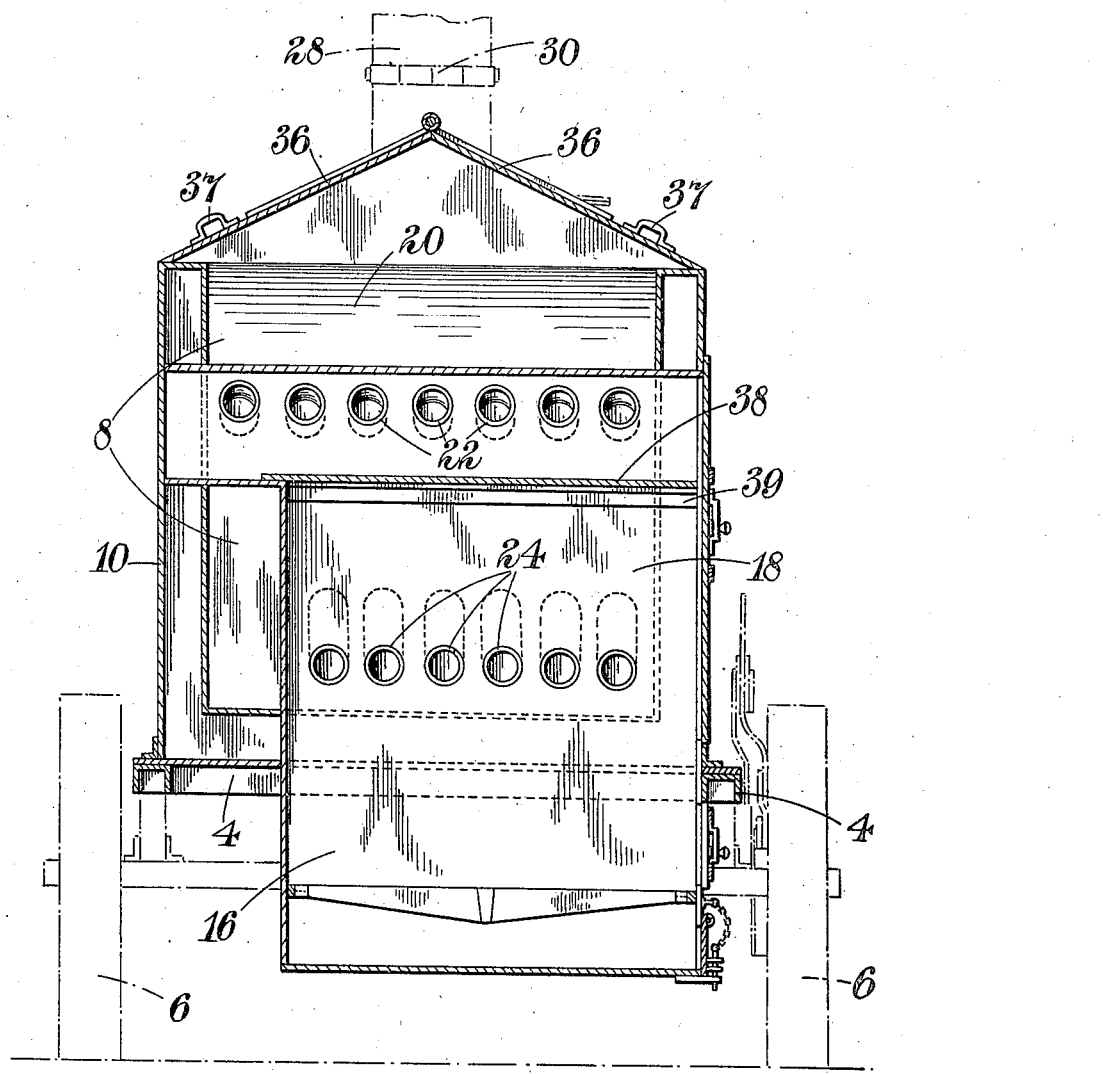

Patented Sept. 18, 1923.

1,468,365

UNITED STATES PATENT OFFICE.

JAMES THOMAS MITCHELL JOHNSTON, OF LONDON, ENGLAND.

HEATER FOR BITUMEN OR OTHER MATERIALS.

Application filed September 26, 1922. Serial No. 590,718.

*To all whom it may concern:*

Be it known that I, JAMES THOMAS MITCHELL JOHNSTON, a subject of the King of England, residing at London, England, have invented certain new and useful Improvements in Heaters for Bitumen or Other Materials, of which the following is a specification.

Difficulty is experienced in melting materials such as bitumen or pitch owing partly to their low heat conductivity and partly to their relatively high latent heat of fusion, much time and labour being occupied in melting such materials in cauldrons or boilers, such as are used in road-making, since the mixture of solid and liquid materials has to be stirred continually for some considerable time before the whole mass is melted.

The present invention, while applicable to the melting of solid or semi-solid materials generally, is particularly applicable to apparatus used for melting and heating bitumen, pitch or similar solid materials used in road-making or similar operations, and in this connection the object of the invention is to provide such an apparatus which will melt solid bitumen or the like more quickly than those hitherto in use and without the laborious stirring which has heretofore been necessary.

Accordingly, the invention consists in a heater for bitumen or other material having a heated support for solid material which is provided with means, or is constructed, to prevent escape of the solid material upon it while permitting the melted material to flow from it. Thus heat is transmitted directly to the solid material during the whole period of melting, since the liquid material flows away from the support and cannot therefore obstruct the passage of heat to the material to be melted.

The heated support is perferably combined with a cauldron to constitute a unitary device and the said support is so mounted in relation to the cauldron that the molten material flows into the cauldron by gravity.

The said support may be a grid of fluepipes, through which the furnace gases pass (for example the gases from the furnace that heats the receptacle for the molten material), this grid of flue-pipes being preferably arranged substantially horizontally above the said receptacle—for example the cauldron of a portable bitumen melter and heater.

Preferably, the cauldron is heated by a flue or flues for furnace gases either from the same furnace as that which supplies the grid of flue-pipes, or from a separate furnace. The flue or flues are preferably in parallel with said grid and dampers are provided whereby the flow of furnace gases through the grid-pipes and the flue or flues may be separately controlled.

A heater for bitumen, pitch or the like for use in road-making or similar operations, and constructed according to this invention is illustrated in the accompanying drawings, in which—

Figure 1 is a side elevation partly in section, and

Figure 2 is a section on the line 2—2 in Figure 1.

Both figures of the drawing are to some extent diagrammatic, in order to show the construction more clearly.

A frame 4, mounted on wheels 6, supports a double-wall cauldron consisting of a cauldron proper 8 and an outer casing 10, there being a space between the cauldron and the casing extending round the four sides of the cauldron and beneath it, as clearly shown in both figures of the drawing.

A furnace 12 communicating with the space between the cauldron and the casing is arranged below the frame. The products of combustion from this furnace pass through the space aforesaid and into an uptake 14.

A second furnace 16 beneath the frame communicates with a chamber 18 which extends upwardly within the cauldron 8. This chamber 18 does not extend completely across the cauldron except at its top, and is spaced from the forward end of the cauldron, so that the latter extends round three sides of the lower part of the chamber and a perforated slightly curved plate 19 extends between the top of the chamber 18 and the adjacent wall of the cauldron.

Extending between the chamber 18 and a smoke-box 20 at the rear end of the cauldron are two horizontal rows of flue-pipes 22 and 24, one row 22 near the top of the chamber 18 and the other row 24 near the bottom. The pipes are preferably welded into the walls of the smoke-box and the chamber 18. All the pipes are slightly bent, as shown, to provide for expansion, and the lower pipes 24 trend slightly upwards towards the smoke-box, from which extends an uptake 26. The two uptakes 14 and 26 open into a common chimney 28 which is hinged, as at 30, to enable it to be turned horizontally along the top of the cauldron. Each uptake is provided with a sliding damper (32 and 34 respectively) so that the draught of either or both of the furnaces 12 and 16 may be controlled.

The cauldron is closed at the top by centrally hinged lids 36 provided with handles 37; there being three such lids on each side.

In order to prevent burning of the bottom of the cauldron 8, a removable iron plate (not shown) is preferably secured to the bottom of the cauldron immediately above the furnace 12.

It will readily be understood that the flue-pipes 22, the top of the chamber 18, and the plate 19, heated by gases from the furnace 16, together constitute a grid-like melting surface, and that solid bitumen, pitch or other material placed upon it will be retained thereupon and rapidly melted, the liquid flowing into the cauldron below where it is kept hot by the heat of the two furnaces transmitted through the bottom and sides of the cauldron 8, the sides of the chamber 18 and the pipes 24.

In order to enable the pipes 22 to be closed independently of the pipes 24, a removable damper-plate 38 is provided in the chamber 18, resting on angle-irons 39 secured to the walls of the chamber, and it will be seen that by manipulating the dampers 32, 34 and 38 any desired effect can be produced. When starting to melt bitumen, the damper 32 is closed and a damper 38 is removed, so that the pipes alone are heated. When the cauldron is full, the damper 38 is replaced; and if, at the end of a day's use, the cauldron still has some bitumen in it, both dampers 34 and 38 are closed, and the furnace 12 banked up for the night, in order to maintain the bitumen in a liquid condition. If bitumen is allowed to solidify in the cauldron, it may be melted comparatively quickly by closing the damper 38 and opening both uptake dampers 32 and 34.

The melted material is drawn off through a pipe 40 and cock 42, the pipe 40 passing through the smoke-box 20 and the space between the cauldron and the outer casing, whereby chilling of the material and choking of the pipe are prevented.

The size and spacing of the pipes 22 as shown in the drawings are suitable for materials which are solid at ordinary temperatures. In a heater according to this invention intended for liquefying semi-solid materials such as a mixture of tar and pitch, the pipes constituting the grid are preferably smaller and spaced more closely together than those shown.

The wheels 6 may be replaced by rollers, or preferably both rollers and wheels may be used, the latter being of larger diameter than the former and mounted for easy removal from the axles. In this case the wheels are used for transporting the boiler and are removed so that the boiler rests on the rollers when in use for road-making.

When melting and heating what is known as "filled" bitumen—that is, bitumen mixed with sand or other filler—it is advisable to agitate the melted material in the cauldron, in order to prevent the filler from separating out. This may be done in the apparatus above described by providing rotary or other agitators or paddles within the cauldron, to be rotated either by hand or by power. The lower tubes 24 may be omitted when agitators are provided.

The filler may of course be added to unfilled bitumen or other material in the cauldron. In this case it is preferable to introduce the filler through tubes or other conduits opening below the tubes 22, in order to prevent fouling of the latter.

I claim:—

1. In apparatus for melting and heating bitumen or like material, the combination of a cauldron for containing molten material, a plurality of tubes constituting a grid-like melting device situated above the level of the material in the cauldron, which device is adapted to retain solid or semi-solid material upon it and to permit melted material to flow through it into the cauldron, a furnace for heating the cauldron, flues in said cauldron below the normal level of the molten material therein, a second furnace arranged to heat the cauldron, and means for supplying furnace gases from said second furnace through said flues and the tubes of said melting device in parallel, substantially as described.

2. In apparatus for melting and heating bitumen or like material, the combination of a cauldron for containing molten material, a plurality of tubes constituting a grid-like melting device situated above the level of the material in the cauldron, which device is adapted to retain solid or semi-solid material upon it and to permit melted material to flow through it into the cauldron, a furnace for heating the cauldron, flues in said cauldron below the normal level of the molten material therein, a second furnace, means for supplying furnace gases from said second furnace through said flues and the tubes of said melting device in parallel, and means controlling independently the passage of the furnace gases through said flues and said tubes, substantially as described.

3. Apparatus for melting and heating bitumen or other material, comprising in combination a cauldron, a furnace for heating the same, a second furnace having a box-like extension in one end of the cauldron, an up-take for gases at the other end of the cauldron, a grid of heating tubes constituting a support for solid material to be melted situated in the upper part of the cauldron, smoke tubes situated in the lower part of said cauldron, said heating tubes and smoke tubes opening into said box-like extension and into said up-take, and means for controlling independently the passage of furnace gases through said heating tubes and said smoke tubes, substantially as described.

4. Apparatus for melting and heating bitumen or other material, comprising in combination a cauldron, a furnace for heating the same, a second furnace having a box-like extension in one end of the cauldron, only the upper part of which extension extends from side to side of the cauldron, an up-take for gases at the other end of the cauldron, a grid of heating tubes constituting a support for solid material to be melted situated in the upper part of the cauldron and opening into the upper part of said box-like extension and said up-take, smoke tubes situated in the lower part of said cauldron and opening into the lower part of said box-like extension and said up-take, and a damper for shutting off the said upper from the said lower part of said box-like extension, substantially as described.

5. Apparatus for melting and heating bitumen or other material, comprising in combination a cauldron, a furnace for heating the same, a chimney, a cauldron-heating flue connecting said furnace with said chimney, a second furnace having a box-like extension in one end of the cauldron, only the upper part of which extension extends from side to side of the cauldron, an up-take for gases at the other end of the cauldron opening into said chimney, a grid of heating tubes constituting a support for solid material to be melted, situated in the upper part of the cauldron and opening into the upper part of said box-like extension and said up-take, smoke tubes situated in the lower part of said cauldron, and opening into the lower part of said box-like extension and said up-take, a damper for shutting off the said upper from the said lower part of said box-like extension, and two dampers controlling communication between the chimney and said cauldron-heating flue and said up-take respectively, substantially as described.

6. A heater for bitumen or other material comprising in combination a cauldron, a furnace, a cauldron-heating flue communicating with said furnace, a grid of flue-pipes constituting a support for solid material to be melted and situated in the upper part of the cauldron, a plurality of smoke-tubes situated in the lower part of the cauldron, a second furnace communicating with the grid of flue-pipes and with the smoke-tubes, and means for controlling independently the passage of furnace gases through the cauldron-heating flue, through the smoke tubes and through the grid of flue-pipes.

In testimony whereof I affix my signature.

JAMES THOMAS MITCHELL JOHNSTON.